United States Patent
Sun et al.

(10) Patent No.: US 11,583,839 B2
(45) Date of Patent: Feb. 21, 2023

(54) CATALYST FOR PREPARING HYDROCARBONS FROM CARBON DIOXIDE BY ONE-STEP HYDROGENATION AND METHOD FOR PREPARING SAME

(71) Applicant: SHANGHAI ADVANCED RESEARCH INSTITUTE, CHINESE ACADEMY OF SCIENCES, Shanghai (CN)

(72) Inventors: Yuhan Sun, Shanghai (CN); Shanshan Dang, Shanghai (CN); Peng Gao, Shanghai (CN); Xianni Bu, Shanghai (CN); Ziyu Liu, Shanghai (CN); Hui Wang, Shanghai (CN); Liangshu Zhong, Shanghai (CN); Minghuang Qiu, Shanghai (CN); Zhibiao Shi, Shanghai (CN)

(73) Assignee: SHANGHAI ADVANCED RESEARCH INSTITUTE, CHINESE ACADEMY OF SCIENCES, Shanghai (CN)

( * ) Notice: Subject to any disclaimer, the term of this patent is extended or adjusted under 35 U.S.C. 154(b) by 754 days.

(21) Appl. No.: 16/475,122

(22) PCT Filed: May 10, 2017

(86) PCT No.: PCT/CN2017/083680
§ 371 (c)(1),
(2) Date: Oct. 30, 2019

(87) PCT Pub. No.: WO2018/120576
PCT Pub. Date: Jul. 5, 2018

(65) Prior Publication Data
US 2022/0118430 A1    Apr. 21, 2022

(30) Foreign Application Priority Data

Dec. 30, 2016 (CN) .......................... 201611252854.4

(51) Int. Cl.
*B01J 37/03* (2006.01)
*B01J 29/46* (2006.01)
(Continued)

(52) U.S. Cl.
CPC ............... *B01J 29/46* (2013.01); *B01J 19/14* (2013.01); *B01J 20/3021* (2013.01);
(Continued)

(58) Field of Classification Search
None
See application file for complete search history.

(56) References Cited

FOREIGN PATENT DOCUMENTS

| CN | 1127240 A | 7/1996 |
|---|---|---|
| CN | 106311317 A | 1/2017 |

(Continued)

OTHER PUBLICATIONS

Li, N. et al. "Size Effects of ZnO Nanoparticles in Bifunctional Catalysts for Selective Syngas Conversion" ACS Catal. 2019, 9, 960-966, Published Dec. 10, 2018 (Year: 2018).*

(Continued)

*Primary Examiner* — Coris Fung
*Assistant Examiner* — Keling Zhang

(57) ABSTRACT

Disclosed are a catalyst for preparing hydrocarbons from carbon dioxide by one-step hydrogenation and a method for preparing same. The catalyst includes nano-metal oxides and hierarchical zeolites, where the mass fraction of the nano-metal oxides in the catalyst is 10%-90%, and the mass fraction of the hierarchical zeolites in the catalyst is 10%-90%. The catalyst has excellent catalytic performance, good reaction stability and high selectivity for desired products, and in the hydrocarbons, $C_2^=-C_4^=$ reach up to 80%, $C_{5+}$ reach up to 80%, and aromatics reach up to 65%.

6 Claims, 1 Drawing Sheet

(51) Int. Cl.
| | |
|---|---|
| *B01J 19/14* | (2006.01) |
| *B01J 20/30* | (2006.01) |
| *B01J 21/06* | (2006.01) |
| *B01J 23/06* | (2006.01) |
| *B01J 23/08* | (2006.01) |
| *B01J 23/10* | (2006.01) |
| *B01J 23/26* | (2006.01) |
| *B01J 23/745* | (2006.01) |
| *B01J 29/08* | (2006.01) |
| *B01J 29/40* | (2006.01) |
| *B01J 29/70* | (2006.01) |
| *B01J 29/76* | (2006.01) |
| *B01J 29/85* | (2006.01) |
| *B01J 35/02* | (2006.01) |
| *B01J 37/00* | (2006.01) |
| *B01J 37/04* | (2006.01) |
| *B01J 37/06* | (2006.01) |
| *B01J 37/08* | (2006.01) |
| *B01J 37/18* | (2006.01) |
| *C10G 2/00* | (2006.01) |

(52) U.S. Cl.
CPC ............ *B01J 21/066* (2013.01); *B01J 23/06* (2013.01); *B01J 23/08* (2013.01); *B01J 23/10* (2013.01); *B01J 23/26* (2013.01); *B01J 23/745* (2013.01); *B01J 29/088* (2013.01); *B01J 29/405* (2013.01); *B01J 29/7057* (2013.01); *B01J 29/7092* (2013.01); *B01J 29/7615* (2013.01); *B01J 29/85* (2013.01); *B01J 35/023* (2013.01); *B01J 37/009* (2013.01); *B01J 37/0063* (2013.01); *B01J 37/031* (2013.01); *B01J 37/04* (2013.01); *B01J 37/06* (2013.01); *B01J 37/082* (2013.01); *B01J 37/18* (2013.01); *C10G 2/50* (2013.01)

(56) References Cited

FOREIGN PATENT DOCUMENTS

| JP | 01190638 A | * | 7/1989 | ............... C07C 1/12 |
| JP | 01190638 A | | 7/1989 | |

OTHER PUBLICATIONS

Jiao et al., Selective conversion of syngas to light olefins, Science, 2016, 351, 6277 (Year: 2016).*
Tayed, How can I mix two different ceramics powders via ball milling without reducing particles size, 2015 (Year: 2015).*
Uzal et al., Blended cements containing high volume of natural zeolites: Properties, hydration and paste microstructure, Cement & Concrete Composites, 2012, 34, 101-109 (Year: 2012).*
Takeuchi et al., Enhancement of the photocatalytic reactivity of $TiO_2$ nano-particles by a simple mechanical blending with hydrophobic mordenite (MOR) zeolite, Applied Catalysis B: Environmental 89, 2009, 406-410 (Year: 2009).*
Kosanovic et al., Cu-Al-O powders prepared from zeolite precursors by combination treatment of ball milling and heating, Croatica Chemica Acta, 2008, 431-435 (Year: 2008).*
Machine translation of Tsutomu et al., JPH01190638A (Year: 1989).*
Jiao, F. et al., "Selective Conversion of Syngas to Light Olefins", Science, 351(6277), Mar. 4, 2016 (Mar. 4, 2016), p. 1065, col. 3, paragraph 2, supplementary materials for selective conversion of syngas to light olefins, and p. 2, lines 3-15 and 19-21, and figures 2 and S1.
Dai, C.Y. et al., "Facile One-step Synthesis of Hierarchical Porous Carbon Monoliths as Superior Supports of Fe-based Catalysts for $CO_2$ Hydrogenation", RSC Adv, No. 6, Jan. 18, 2016 (Jan. 18, 2016), pp. 10831-10836.

* cited by examiner

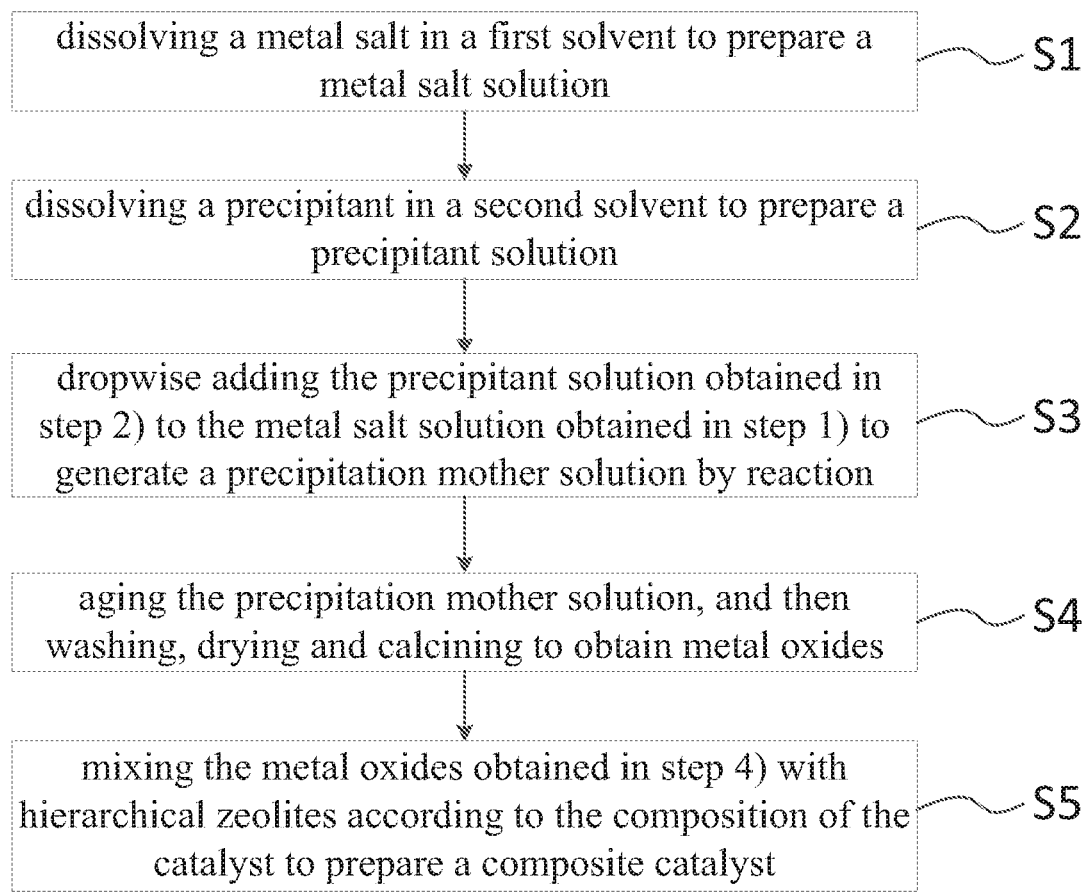

CATALYST FOR PREPARING HYDROCARBONS FROM CARBON DIOXIDE BY ONE-STEP HYDROGENATION AND METHOD FOR PREPARING SAME

CROSS REFERENCES TO RELATED APPLICATION

This is a National Stage of PCT International Application No. PCT/CN2017/08368, filed on May 10, 2017, which claims the benefits of priority to Chinese Patent Application No. CN 2016112528544, entitled "Catalyst for Preparing Hydrocarbons from Carbon Dioxide by One-Step Hydrogenation and Method for Preparing Same", filed with CNIPA on Dec. 30, 2016, the contents of which are incorporated herein by reference in its entirety.

BACKGROUND OF THE PRESENT DISCLOSURE

Field of Disclosure

The present disclosure relates to the field of catalyst technology, and in particular, to a catalyst for preparing hydrocarbons from carbon dioxide by one-step hydrogenation and a method for preparing same.

Description of Related Arts

Carbon dioxide ($CO_2$) is an easily available renewable carbon resource that abundantly exists in nature. The utilization of $CO_2$ as a feedstock for producing various value-added chemicals or fuels not only contributes to alleviating global climate changes caused by increasing $CO_2$ emissions but also offers a solution to replacing dwindling fossil fuel reserves. With the assistance of hydrogen ($H_2$) produced from new energy, the hydrogenation of $CO_2$ can be converted into chemicals (methanol, formic acid, dimethyl ether, etc.), synthesis gas, liquid fuels or other products. Among all, the hydrocarbons, such as lower olefins ($C_2^=$-$C_4^=$), long-chain hydrocarbons ($C_{5+}$) or aromatics, are considered to be potential products with economic value and widespread application. It is easy to convert $CO_2$ to one-carbon molecules such as methane, methanol and carbon monoxide, however it is difficult to synthesize $C_{2+}$ (hydrocarbons with two or more carbons) products due to the chemical inertness of $CO_2$.

SUMMARY OF THE PRESENT DISCLOSURE

The present disclosure provides a catalyst for preparing hydrocarbons from carbon dioxide by one-step hydrogenation and a method for preparing same. The catalyst exhibits excellent catalytic performance, good reaction stability and high selectivity of desired products.

The present disclosure provides a catalyst for preparing hydrocarbons from carbon dioxide by one-step hydrogenation. The catalyst is composed of nano-metal oxides and hierarchical zeolites, wherein the mass fraction of the nano-metal oxides in the catalyst is 10%-90%, and the mass fraction of the hierarchical zeolites in the catalyst is 10%-90%.

Preferably, the nano-metal oxides are selected from a group of MgO, ZnO, $Al_2O_3$, $Cr_2O_3$, $Y_2O_3$, $La_2O_3$, $Ga_2O_3$, $In_2O_3$, $Fe_3O_4$, $MnO_2$, $TiO_2$, $ZrO_2$, $SnO_2$ and $CeO_2$, or a combination thereof. Compared with other metal oxides, the nano-metal oxides have a small particle size of 10-30 nm, a large specific surface area of 70-150 $m^2/g$, and a higher catalytic performance.

Preferably, the hierarchical zeolites combining of the microporous and mesoporous can be obtained by alkali treatment of conventional zeolites. Introduction of the mesopores by alkali treatment can greatly shorten the diffusion path of molecules in microchannel of zeolites, which is beneficial to the mass transfer of intermediates, and therefore significantly enhances the catalytic activity and improves the stability of the catalyst. As a microreactor, the micropores not only provide an active center or an adsorption site, but also have selectivity of the shape and size of molecules.

Preferably, the microporous zeolites are selected from a group of Y, ZSM-5, ZSM-22, Beta, MCM-22 and SAPO-34 zeolites, or a combination thereof.

Preferably, the alkali treatment can be carried out by using a current technology. For example: (1) 0.15-0.25 mol/L NaOH is used as an alkali source, the treatment temperature is 60-75° C., and the treatment time is 25-35 min; (2) 0.15-0.30 mol/L organic alkali (tetrapropylammonium hydroxide, tetrabutylammonium hydroxide and tetramethylammonium hydroxide) is used as alkali sources, the treatment temperature is 60-75° C., and the treatment time is 25-50 min.

Preferably, the specific surface area of the hierarchical zeolites is 100-1000 $m^2/g$.

Preferably, the hierarchical zeolites comprise micropores and mesopores, wherein the mesopore diameter is 2-40 nm and a mesopore volume is 0.1-0.9 $cm^3/g$.

The present disclosure further discloses a method for preparing the catalyst as mentioned above, comprising the following steps: 1) dissolving a metal salt in a solvent to prepare a metal salt solution; 2) dissolving a precipitant in a solvent to prepare a precipitant solution; 3) dropwise adding the precipitant solution obtained in step 2) to the metal salt solution obtained in step 1) to generate a precipitation mother solution by reaction; 4) aging the precipitation mother solution, and then washing, drying and calcining to obtain metal oxides; 5) mixing the metal oxides obtained in step 4) with hierarchical zeolites according to the catalyst composition to prepare a composite catalyst.

Preferably, in the step 1), the metal salt is selected from a group of hydrochloride, nitrate, bromide, acetate, oxalate and ammonium salt, or a combination thereof.

Preferably, in the step 1), the solvent is selected from one or both of water and alcohol.

More preferably, in the step 1), the solvent is a combination of both alcohol and water, and the volume ratio of the alcohol to the water is (1-3):(1-4). Further preferably, the alcohol is selected from methanol, ethanol or propanol.

Preferably, in the step 1), the concentration of the metal salt solution is 0.1-1 mol/L.

Preferably, in the step 2), the precipitant is selected from a group of ammonia water, ammonium carbonate, sodium carbonate, sodium hydroxide and sodium acetate, or a combination thereof.

Preferably, in the step 2), the solvent is selected from one or both of water and alcohol.

More preferably, in the step 2), the solvent is a combination of both alcohol and water, and the volume ratio of the alcohol to the water is (1-3):(1-4). Further preferably, the alcohol is selected from methanol, ethanol or propanol.

Preferably, in the step 2), the concentration of the precipitant solution is 0.1-2 mol/L.

Preferably, in step 3), the reaction temperature is 10-40° C.; after the reaction is completed, the pH value of the precipitation mother solution is 7-11.

Preferably, in the step 4), the precipitation mother solution is aged at a certain temperature such that the precipitated particles are further enlarged. The aging temperature is 60-100° C., and the aging time is 0.1-10 h.

Preferably, in the step 4), the drying temperature is 60-120° C., and the drying time is 6-24 h.

Preferably, in the step 4), the calcination temperature is 250-600° C., and the calcination time is 1-8 h.

Preferably, in step 5), the mixing method is any one of mechanical mixing, grinding mixing and ball milling mixing.

Preferably, the mechanical mixing comprises the following steps: crushing and sieving the metal oxides and the hierarchical zeolites to obtain nanoparticles of 20-80 meshes, and placing the nanoparticles in a glass container and evenly mixing by vibration.

Preferably, the grinding mixing comprises the following steps: placing the metal oxides and the hierarchical zeolites in an agate mortar and grinding for 0.1-4 h, and then crushing and sieving to obtain nanoparticles of 20-80 meshes.

Preferably, the ball milling mixing comprises the following steps: placing the metal oxides and the hierarchical zeolites in a ball mill and ball-milling for 0.1-24 h, and then crushing and sieving to obtain nanoparticles of 20-80 meshes.

The present disclosure further discloses application of the catalyst as mentioned above in a reaction for preparing hydrocarbons from carbon dioxide by one-step hydrogenation.

Preferably, prior to reaction, the catalyst is activated in an atmosphere of inert gas Ar, $N_2$ or He, or an atmosphere of reducing gas $H_2$, at the temperature of 250-600° C. for 1-10 h.

Preferably, the reaction conditions for the preparing hydrocarbons from carbon dioxide by one-step hydrogenation are: the reaction pressure is 0.3-5.0 MPa, the reaction temperature is 300-450° C., the volumetric space velocity is 1000-12000 $h^{-1}$, and the $H_2/CO_2$ molar ratio is 1-5.

Preferably, the reaction for preparing hydrocarbons from carbon dioxide by one-step hydrogenation is carried out in a fixed bed reactor.

As described above, the catalyst for preparing hydrocarbons from carbon dioxide by one-step hydrogenation and the method for preparing same provided in the present disclosure have the following beneficial effects:

The metal salt and the precipitant are fully mixed in proportion to generate a solid phase precursor which is easily decomposed. And the solid phase precursor is then washed several times, calcined and ground to obtain the nano-metal oxides. A composite catalyst is obtained by mixing the nano-metal oxides and the hierarchical zeolites. The nano-metal oxide catalyst owing a small particle size has high $CO_2$ activation capacity and moderate hydrogenation capacity; while the mesopores of the hierarchical zeolites are beneficial of mass transfer and diffusion of intermediates during the reaction, thus driving the reaction equilibrium to obtain high selectivity of target products, and reducing coke deposition and improving the catalytic stability.

The catalyst obtained in the present disclosure has excellent catalytic performance, good reaction stability and high selectivity of desired products. In the distribution of hydrocarbons, the selectivity of $C_2^=$-$C_4^=$ can reach up to 80%, and the selectivity of $C_{5+}$ can reach up to 85%, and aromatics can reach up to 65% with the methane selectivity of lower than 5%.

Owing to the simple and controllable preparation process of the catalyst provided by the present disclosure, the production is more efficient and economical.

BRIEF DESCRIPTION OF THE DRAWINGS

FIG. 1 is a flow chart of the method for preparing a catalyst according to the present disclosure.

DETAILED DESCRIPTION OF THE PREFERRED EMBODIMENTS

Implementations of the present disclosure were described below by using particular specific instances, and a person skilled in the art may easily learn of other advantages and effects of the present disclosure from the content disclosed in this specification. The present disclosure may also be implemented or applied by using additional different specific implementations, and various modifications or changes may be made to various details in this specification based on different opinions and applications without departing from the spirit of the present disclosure.

The research on $CO_2$ hydrogenation to hydrocarbons is mainly divided into two routes: one is a reaction via the modified Fischer-Tropsch synthesis (FTS) process without the methanol intermediate; the other is the reaction with the methanol intermediate. At present, most of research works focus on the modified FTS reaction route without the methanol intermediate, which consists of two main consecutive reactions: reverse water gas shift (RWGS) reaction to produce CO followed by the further conversion of CO to hydrocarbons via Fischer-Tropsch reaction. The catalysts of the $CO_2$-based FTS are similar with the conventional FTS catalysts which mainly include cobalt-based catalysts and iron-based catalysts. However, under a $CO_2/H_2$ regime, the cobalt catalysts behave like a methanation catalyst rather than performing as a FTS catalyst, and has no activity on the RWGS reaction. While the modified iron-based catalysts remain the preferred catalyst candidate for $CO_2$-FTS process owing to their excellent ability to catalyze both RWGS and FTS processes and high olefinic nature of obtained products. However, the iron-based catalysts have a complicated phase structure, poor chain growth ability, short life and low Fischer-Tropsch activity which result in high selectivity of by-product CO. In addition, the iron-based catalysts have no advantage in the synthesis of long-chain hydrocarbons. Moreover, although the iron-based catalysts have much lower activity in $CO_2$ methanation than the cobalt-based catalysts, the selectivity of methane is still higher than 20%. For the one-step hydrogenation of $CO_2$ to hydrocarbons via methanol or other intermediates, the methanol or other intermediates are obtained over a metal catalyst, such as a copper-zinc-based metal catalyst, and then converted into other hydrocarbons. The reaction for hydrocarbons synthesis is in favor of high reaction temperature since it is an endothermic reaction. However, as an exothermic reaction, the methanol or the other intermediates synthesis is thermodynamically restrained at high temperature. Therefore, it is the key to break through the thermodynamic equilibrium to obtain the desired hydrocarbons with high selectivity under the premise of ensuring lower methane selectivity.

Embodiment 1

40.4 g $Fe(NO_3)_3 \cdot 9H_2O$ was added into 1 L deionized water to prepare a mixed metal salt solution with the metal ion concentration of 0.1 mol/L. 5.30 g sodium carbonate was added to a mixed solution of 0.25 L deionized water and 0.25 L ethanol to prepare a precipitant solution of 0.1 mol/L. The precipitant solution was dropwise added to the metal salt solution with vigorous stirring at 20° C., and the final pH value was maintained at 9. After a precipitation reaction was completed, the product was aged under stirring at 70° C. for 4 h, and then filtered and washed with deionized water for several times. After that, the filter cakes were dried at 80° C. for 12 h and calcined at 350° C. for 4 h to obtain metal oxide. After characterization, the metal oxide has a particle diameter of 20 nm and a specific surface area of 75 m$^2$/g. H-ZSM-5 hierarchical zeolites with a specific surface area of 500 m$^2$/g, a mesopore diameter of 4.1 nm and a mesopore volume of 0.41 cm$^3$/g were used. Based on the total mass of the catalyst, the content of the metal oxide was 10%, and the content of the hierarchical zeolites was 90%. The metal oxide and the hierarchical zeolites in proportion were ground together in an agate mortar for 2 h, and then crushed and sieved to obtain a 40-60 mesh composite catalyst.

The reaction for the synthesis of hydrocarbons from carbon dioxide hydrogenation was carried out in a stainless tubular reactor with an inner diameter of 8 mm. Prior to reaction, the catalyst was activated at 350° C. for 4 h in an atmosphere of inert gas Ar. Then a reactant gas mixture of $H_2$ and $CO_2$ with a molar ratio of 3:1 was fed into the reactor, and the reaction conditions was 5.0 MPa, 300° C. and gas hourly space velocity (GHSV)=4000 h$^{-1}$. The aqueous products gathered from the cold trap were analyzed by gas chromatography, and the evaluation results were shown in Table 1.

Embodiment 2

13.32 g Cr(NO$_3$)$_2$.9H$_2$O and 28.62 g Zr(NO$_3$)$_4$.5H$_2$O were added to a mixed solution of 0.1 L water and 0.025 L ethanol to prepare a mixed metal salt solution with the metal ion concentration of 0.8 mol/L. 3.3 mL ammonia aqueous was added to a mixed solution of 0.05 L ethanol to prepare a precipitant solution of 1 mol/L. The precipitant solution was dropwise added to the metal salt solution with vigorous stirring at 25° C., and the final pH value was maintained at 10. After a precipitation reaction was completed, the product was aged under stirring at 60° C. for 6 h, and then filtered and washed with deionized water for several times. After that, the filter cakes were dried at 60° C. for 18 h and calcined at 300° C. for 3 h to obtain metal oxide. The metal oxide with a particle diameter of 10 nm and a specific surface area of 136 m$^2$/g was crushed and sieved to particles in the range of 20-40 meshes. The H-SAPO-34 hierarchical zeolites with a specific surface area of 340 m$^2$/g, a mesopore diameter of 28 nm and a mesopore volume of 0.19 cm$^3$/g were crushed to particles in the range of 40-60 meshes. Based on the total mass of the catalyst, the content of the metal oxide was 50%, and the content of the hierarchical zeolites was 50%. The metal oxide and zeolites in proportion were placed in a glass container and uniformly mixed by vibration to obtain a composite catalyst.

The reaction for the synthesis of hydrocarbons from carbon dioxide hydrogenation was carried out in a stainless tubular reactor with an inner diameter of 8 mm. Prior to reaction, the catalyst was activated at 400° C. for 2 h in an atmosphere of Ar. Then a gas mixture of $H_2$ and $CO_2$ with the molar ratio of 2:1 was fed into the reaction, and the reaction condition was 3.0 MPa, 400° C. and GHSV=9000 h$^{-1}$. The aqueous products gathered from the cold trap were analyzed by gas chromatography, and the evaluation results were shown in Table 1.

Embodiment 3

41.79 g Ga(NO$_3$)$_3$.xH$_2$O was added to a mixed solution of 0.12 L water and 0.08 L ethanol to prepare a mixed metal salt solution with a metal ion concentration of 0.5 mol/L. 3.3 mL ammonia aqueous was added to a mixed solution of 0.01 L deionized water and 0.02 L ethanol to prepare a precipitant solution of 1.67 mol/L. The precipitant solution was dropwise added to the metal salt solution with vigorous stirring at 15° C., and the final pH value was maintained at 11. After a precipitation reaction was completed, the product was aged under stirring at 100° C. for 1.5 h, then filtered and washed with deionized water for several times. After that, the filter cakes were dried at 60° C. for 24 h and calcined at 300° C. for 7 h to obtain metal oxide. After characterization, the metal oxide has a particle diameter of 23 nm and a specific surface area of 112 m$^2$/g. The H-ZSM-22 hierarchical zeolites with a specific surface area of 445 m$^2$/g, a mesopore diameter of 4.39 nm and a mesopore volume of 0.49 cm$^3$/g were used. Based on the total mass of the catalyst, the content of the metal oxide was 33.3%, and the content of the hierarchical zeolites was 66.7%. The metal oxide and the hierarchical zeolites in proportion were ball-milled together in a ball mill for 24 h, and then crushed and sieved to obtain a 60-80 mesh composite catalyst.

The reaction for the synthesis of hydrocarbons from carbon dioxide hydrogenation was carried out in a stainless tubular reactor with an inner diameter of 8 mm. Prior to reaction, the catalyst was activated at 350° C. for 5 h in an atmosphere of $N_2$. Then a gas mixture of $H_2$ and $CO_2$ with a molar ratio of 4:1 was fed into the reactor, and the reaction condition was 0.5 MPa, 350° C. and GHSV=2000 h$^{-1}$. The aqueous products gathered from the cold trap were analyzed by gas chromatography, and the evaluation results were shown in Table 1.

Embodiment 4

38.3 g Y(NO$_3$)$_4$.6H$_2$O was added to a mixed solution of 0.125 L of deionized water and 0.125 L ethanol to prepare a mixed metal salt solution with a metal ion concentration of 0.4 mol/L. 7.86 g ammonium carbonate was added to a mixed solution of 0.067 L deionized water and 0.033 L ethanol to prepare a precipitant solution of 0.5 mol/L. The precipitant solution was dropwise added to the metal salt solution with vigorous stirring at 30° C., and the final pH value was maintained at 10. After a precipitation reaction was completed, the product was aged at 80° C. for 5 h under stirring, and then filtered and washed with deionized water for several times. After that the filter cakes were dried at 65° C. for 16 h and calcined at 500° C. for 5 h to obtain metal oxide. After characterization, the metal oxide has a particle diameter of 16 nm and a specific surface area of 98 m$^2$/g. The H-Beta hierarchical zeolites with a specific surface area of 650 m$^2$/g, a mesopore pore diameter of 13.5 nm and a mesopore volume of 0.55 cm$^3$/g were used. Based on the total mass of the catalyst, the content of the metal oxide was 25%, and the content of the hierarchical zeolites was 75%. The metal oxide and the hierarchical zeolites in proportion were ball-milled together in a ball mill for 11 h, and then crushed and sieved to obtain a 20-40 mesh composite catalyst.

The reaction for the synthesis of hydrocarbons from carbon dioxide hydrogenation was carried out in a stainless tubular reactor with an inner diameter of 8 mm. Prior to reaction, the catalyst was activated at 600° C. for 3 h in an atmosphere of $N_2$. Then a gas mixture of $H_2$ and $CO_2$ with a molar ratio of 5:1 was fed into the reactor, and the reaction condition was 2 MPa, 450° C. and GHSV=12000 $h^{-1}$. The aqueous products gathered from the cold trap were analyzed by gas chromatography, and the evaluation results were shown in Table 1.

Embodiment 5

9.91 g $Zn(NO_3)_2 \cdot 6H_2O$ and 28.64 g $Zr(NO_3)_4 \cdot 5H_2O$ were separately added to a mixed solution of 0.025 L deionized water and 0.1 L ethanol to prepare a mixed metal salt solution with a metal ion concentration of 0.8 mol/L. 5.30 g sodium carbonate was added to a mixed solution of 0.015 L deionized water and 0.01 L ethanol to prepare a precipitant solution of 2 mol/L. The precipitant solution was dropwise added to the metal salt solution under stirring at 40° C., and the final pH value was maintained at 8. After a precipitation reaction was completed, the product was aged at 100° C. for 2 h under stirring, and then filtered and washed with deionized water for several times. After that the filter cakes were dried at 100° C. for 10 h and calcined at 500° C. for 2.5 h to obtain metal oxide. The metal oxide with a particle diameter of 27 nm and a specific surface area of 70 $m^2/g$, was crushed and sieved to particles in the range of 40-60 meshes. The H—Y hierarchical zeolites with a specific surface area of 580 $m^2/g$, a mesopore diameter of 7 nm and a mesopore volume of 0.85 $cm^3/g$ were crushed and sieved to 40-60 meshes. Based on the total mass of the catalyst, the content of the metal oxide was 20%, and the content of the hierarchical zeolites was 80%. The metal oxide and the molecular sieves in proportion were crushed and sieved to obtain particles in the range of 40-60 meshes, and then the particles were placed in a glass container and uniformly mixed by vibration to obtain a composite catalyst.

The reaction for the synthesis of hydrocarbons from carbon dioxide hydrogenation was carried out in a stainless tubular reactor with an inner diameter of 8 mm. Prior to reaction, the catalyst was activated at 600° C. for 1.5 h in an atmosphere of $N_2$. Then a gas mixture of $H_2$ and $CO_2$ with a molar ratio of 3:1 was fed into the reactor, and the reaction condition was 3 MPa, 450° C. and GHSV=7000 $h^{-1}$. The aqueous products gathered from the cold trap were analyzed by gas chromatography, and the evaluation results were shown in Table 1.

Embodiment 6

9.91 g $Zn(NO_3)_2 \cdot 6H_2O$ and 28.64 g $Zr(NO_3)_4 \cdot 5H_2O$ were separately added to 0.1 L deionized water to prepare a mixed metal salt solution with a metal ion concentration of 1 mol/L. 5.30 g sodium carbonate was added to 0.05 L deionized water to prepare a precipitant solution of 1 mol/L. The precipitant solution was dropwise added to the metal salt solution with vigorous stirring at 40° C., and the final pH value was maintained at 7. After a precipitation reaction was completed, the product was aged under stirring at 80° C. for 2 h, and then filtered and washed with deionized water for several times. After that, the filter cakes were dried at 100° C. for 7 h and calcined at 350° C. for 5 h to obtain metal oxide. The metal oxide with a particle diameter of 15 nm and a specific surface area of 131 $m^2/g$ was crushed and sieved to 40-60 meshes. The H-ZSM-5 hierarchical zeolites with a specific surface area of 600 $m^2/g$, a mesopore diameter of 15.3 nm and a mesopore volume of 0.46 $cm^3/g$ were crushed and sieved to 40-60 meshes. Based on the total mass of the catalyst, the content of the metal oxide was 80%, and the content of the hierarchical zeolites was 20%. The metal oxide and the hierarchical zeolites in proportion were crushed and sieved to obtain particles in a range of 40-60 meshes, and then the particles were placed in a glass container and uniformly mixed by vibration to obtain a composite catalyst.

The reaction for the synthesis of hydrocarbons from carbon dioxide hydrogenation was carried out in a stainless tubular reactor with an inner diameter of 8 mm. Prior to reaction, the catalyst was activated at 500° C. for 1.5 h in an atmosphere of $N_2$. Then a gas mixture of $H_2$ and $CO_2$ with a molar ratio of 2:1 was fed into the reactor, and the reaction condition was 3.0 MPa, 450° C. and GHSV=9000 $h^{-1}$. The aqueous products gathered from the cold trap were analyzed by gas chromatography, and the evaluation results were shown in Table 1.

Embodiment 7

38.18 g $In(NO_3)_3 \cdot 4.5H_2O$ was added to a mixed solution of 0.4 L deionized water and 1.6 L ethanol to prepare a mixed metal salt solution with a metal ion concentration of 0.05 mol/L. 7.86 g ammonium carbonate was added to a mixed solution of 0.1 L deionized water and 0.15 L ethanol to prepare a precipitant solution of 0.2 mol/L. The precipitant solution was dropwise added to the metal salt solution with vigorous stirring at 20° C., and the final pH value was maintained at 8.5. After a precipitation reaction was completed, the product was aged under stirring at 80° C. for 2.5 h, and then filtered and washed with deionized water for several times. After that, the filter cakes were dried at 90° C. for 13 h and calcined at 400° C. for 3 h to obtain metal oxide. After characterization, the metal oxide has a particle diameter of 16 nm and a specific surface area of 131 $m^2/g$. The H-ZSM-5 hierarchical zeolites with a specific surface area of 700 $m^2/g$, a mesopore diameter of 5.6 nm and a mesopore volume of 0.57 $cm^3/g$ were used. Based on the total mass of the catalyst, the content of the metal oxide was 50%, and the hierarchical zeolite was 50%. The metal oxides and the hierarchical zeolites in proportion were ground together in an agate mortar for 0.2 h, and then crushed and sieved to obtain a 20-40 mesh composite catalyst.

The reaction for the synthesis of hydrocarbons from carbon dioxide hydrogenation was carried out in a stainless tubular reactor with an inner diameter of 8 mm. Prior to reaction, the catalyst was activated at 450° C. for 2 h in an atmosphere of $H_2$. Then a gas mixture of $H_2$ and $CO_2$ with a molar ratio of 3:1 was fed into the reactor, and the reaction condition was 4 MPa, 340° C. and GHSV=3000 $h^{-1}$. The aqueous products gathered from the cold trap were analyzed by gas chromatography, and the evaluation results were shown in Table 1.

Embodiment 8

38.18 g $In(NO_3)_3 \cdot 4.5H_2O$ was added to a mixed solution of 0.05 L deionized water and 0.05 L ethanol to prepare a mixed metal salt solution with a metal ion concentration of 1 mol/L. 3.3 mL ammonia aqueous was added to a mixed solution of 0.025 L deionized water and 0.025 L ethanol to prepare a precipitant solution of 1 mol/L. The precipitant solution was dropwise added to the metal salt solution with vigorous stirring at 25° C., and the final pH value was maintained at 11. After a precipitation reaction was completed, the product was aged under stirring at 75° C. for 0.5 h, and then filtered and washed with deionized water for several times. After that, the filter cakes were dried at 10° C. for 15 h and calcined at 250° C. for 8 h to obtain metal oxide. After characterization, the metal oxide has a particle diameter of 13 nm and a specific surface area of 150 m²/g. The H-SAPO-34 hierarchical zeolites with a specific surface area of 340 m²/g, a mesopore diameter of 28 nm and a mesopore volume of 0.18 cm³/g were used. Based on the total mass of the catalyst, the content of the metal oxide was 75%, and the content of the hierarchical zeolites was 25%. The metal oxides and the hierarchical zeolites in proportion were ball-milled together in a ball mill for 0.2 h, and then crushed and sieved to obtain a 60-80 mesh composite catalyst.

The reaction for synthesis of hydrocarbons from carbon dioxide hydrogenation was carried out in a stainless tubular reactor with an inner diameter of 8 mm. Prior to reaction, the catalyst was activated at 300° C. for 10 h in an atmosphere of Ar. Then a gas mixture of $H_2$ and $CO_2$ with a molar ratio of 1:1 was fed into the reactor, the reaction condition was 3 MPa, 380° C. and GHSV=6000 The aqueous products gathered from the cold trap were analyzed by gas chromatography, and the evaluation results were shown in Table 1.

Embodiment 9

40.4 g $Fe(NO_3)_3 \cdot 9H_2O$ was added to a mixed solution of 0.14 L deionized water and 0.06 L ethanol to prepare a mixed metal salt solution with a metal ion concentration of 0.5 mol/L. 5.30 g sodium carbonate was added to a mixed solution of 0.036 L deionized water and 0.009 L ethanol to prepare a precipitant solution of 1.1 mol/L. The precipitant solution was dropwise added to the metal salt solution with vigorous stirring at 18° C., and the final pH value was maintained at 9. After a precipitation reaction was completed, the product was aged under stirring at 70° C. for 10 h, and then filtered and washed with deionized water for several times. After that, the filter cakes were dried at 80° C. for 12 h and roasted at 400° C. for 5 h to obtain metal oxide. After characterization, the metal oxide has a particle diameter of 13 nm and a specific surface area of 119 m²/g. The H-Beta hierarchical zeolites with a specific surface area of 650 m²/g, a mesopore diameter of 13.5 nm and a mesopore volume of 0.55 cm³/g were used. Based on the total mass of the catalyst, the content of the metal oxide was 10%, and the content of the hierarchical zeolites was 90%. The metal oxide and the hierarchical zeolites in proportion were ground together in an agate mortar for 4 h, and then crushed and sieved to obtain a 40-60 mesh composite catalyst.

The reaction for synthesis of hydrocarbons from carbon dioxide hydrogenation was carried out in a stainless tubular reactor with an inner diameter of 8 mm. Prior to reaction, the catalyst was activated at 500° C. for 3 h in an atmosphere of $H_2$. Then a gas mixture of $H_2$ and $CO_2$ with a molar ratio of 3:1 was fed into the reactor, the reaction condition was 4 MPa, 370° C. and GHSV=10000 $h^{-1}$. The aqueous products gathered from the cold trap were analyzed by gas chromatography, and the evaluation results were shown in Table 1.

TABLE 1

The catalytic performance of catalysts obtained in Embodiments 1-9

| | $CO_2$ | | | | $C_{5+}$ | | |
|---|---|---|---|---|---|---|---|
| | The distribution of hydrocarbons (C-mol %) | | | | | | |
| Embodiment No. | Conversion % | $CH_4$ | $C_2°-C_4°$ | $C_2^=-C_4^=$ | $C_{5+}$ Aliphatic hydrocarbons | Aromatic hydrocarbons | Deactivation rate %/d |
| 1 | 8.7 | 2.3 | 16.3 | 1.5 | 78.2 | 2.1 | 1.7 |
| 2 | 26.9 | 3.3 | 12.4 | 80.2 | 4.1 | 0 | 0.9 |
| 3 | 9.1 | 4.7 | 32.1 | 27.6 | 32.5 | 3.1 | 3.1 |
| 4 | 21.2 | 2.3 | 51.3 | 25.1 | 20.2 | 1.1 | 1.2 |
| 5 | 38.7 | 4.8 | 37.4 | 20.3 | 36.7 | 0.8 | 1.4 |
| 6 | 45.6 | 4.6 | 14.8 | 4.4 | 11.5 | 64.7 | 1.1 |
| 7 | 18.9 | 1.0 | 11.9 | 2.4 | 59.4 | 25.3 | 2.2 |
| 8 | 19.2 | 2.1 | 15.9 | 78.8 | 3.2 | 0 | 2.1 |
| 9 | 14.3 | 4.6 | 63.1 | 17.4 | 14.9 | 0 | 0.9 |

It can be seen from Table 1 that the use of the catalyst described in this disclosure for one-step hydrogenation of carbon dioxide can improve the selectivity of desired products and reduce the selectivity of methane under appropriate conditions. Specifically, under the conditions of P=0.3-5.0 MPa, T=300-450° C., GHSV=1000-12000 $h^{-1}$ and $n(H_2)/n(CO_2)$=1-5, the catalysts obtained in Embodiments 1-9 have high selectivity of target products, and in the hydrocarbons distribution, $C_2^=-C_4^=$ can reach up to 80.2%, $C_{5+}$ can reach up to 84.7%, and aromatics can reach up to 64.7%, while the main by-product methane has low selectivity of less than 5%. In addition, the deactivation rates of the catalysts were as low as not higher than 2.2%. Therefore, the catalysts obtained in Embodiments 1-9 have high reaction activity with a lower $CH_4$ selectivity, and have high selectivity of the desired products such as lower olefins, long chain hydrocarbons or aromatics, as well as low deactivation rates.

The foregoing embodiments were only to illustrate the principle and effects of the present disclosure and were not intended to limit the present disclosure. Any person skilled in the art can modify or change the foregoing embodiments without departing from the spirit and scope of the present disclosure. Therefore, all modifications and variations completed by a person with ordinary skill in the art without departing from the spirit and technical idea disclosed in the present disclosure should still be covered by the claims of the present disclosure.

What is claimed is:

1. A method for preparing a composite catalyst, wherein the composite catalyst is used for preparing hydrocarbons from carbon dioxide by one-step hydrogenation, the composite catalyst comprises nano-metal oxides and hierarchical zeolites; wherein the hierarchical zeolites comprise micropores and mesopores, and a mesopore volume of the hierarchical zeolites is 0.1-0.9 cm³/g; a mass fraction of the nano-metal oxides in the composite catalyst is 10%-90%, and a mass fraction of the hierarchical zeolites in the composite catalyst is 10%-90%, and the method comprises:
1) dissolving a metal salt in a first solvent to prepare a metal salt solution;
2) dissolving a precipitant in a second solvent to prepare a precipitant solution;
3) dropwise adding the precipitant solution obtained in step 2) to the metal salt solution obtained in step 1) to generate a precipitation mother solution by reaction, wherein a reaction temperature is 10-40° C.;
4) Aging the precipitation mother solution, and then washing, drying and calcining to obtain metal oxides; and
5) Mixing the metal oxides obtained in step 4) with the hierarchical zeolites to prepare the composite catalyst; wherein the hierarchical zeolites are obtained by alkali treatment selected from one of the following:
(A) zeolites are treated with 0.15-0.25 mol/L NaOH being as an alkali source, a treatment temperature is 60-75° C., and a treatment time is 25-35 min; and
(B) zeolites are treated with 0.15-0.30 mol/L organic alkali as an alkali source, wherein the organic alkali comprises tetrapropylammonium hydroxide, tetrabutylammonium hydroxide or tetramethylammonium hydroxide, a treatment temperature is 60-75° C., and a treatment time is 25-50 min.

2. The method as in claim 1, wherein the method further comprises any one or more of the following:
1) in step 1), the metal salt is selected from a group of hydrochloride, nitrate, bromide, acetate, oxalate and ammonium salt, and a combination thereof;
2) in step 1), the first solvent is selected from one and both of water and alcohol;
3) in step 1), a concentration of the metal salt solution is 0.1-1 mol/L;
4) in step 2), the precipitant is selected from a group of ammonia water, ammonium carbonate, sodium carbonate, sodium hydroxide and sodium acetate, and a combination thereof;
5) in step 2), the second solvent is water or alcohol, or a mixture thereof;
6) in step 2), a concentration of the precipitant solution is 0.1-2 mol/L;
7) in step 3), after the reaction is completed, a pH value of the precipitation mother solution is 7-11;
8) in step 4), an aging temperature is 60-100° C., and an aging time is 0.1-10 h;
9) in step 4), a drying temperature is 60-120° C., and a drying time is 6-24 h;
10) in step 4), a calcination temperature is 250-600° C., and a calcination time is 1-8 h.

3. The method as in claim 2, wherein in step 5), the mixing method is any one of mechanical mixing, grinding mixing and ball milling mixing.

4. The method as in claim 3, wherein the mechanical mixing comprises the following steps:
crushing and sieving the metal oxides and the hierarchical zeolites to obtain nanoparticles in the range of 20-80 meshes,
placing the nanoparticles in a glass container, and
mixing by vibration.

5. The method as in claim 3, wherein the grinding mixing comprises the following steps:
placing the metal oxides and the hierarchical zeolites in an agate mortar, grinding for 0.1-4 h, and
crushing and sieving to obtain nanoparticles of 20-80 meshes.

6. The method as in claim 3, wherein the ball milling mixing comprises the following steps:
placing the metal oxides and the hierarchical zeolites in a ball mill,
ball-milling for 0.1-24 h, and
crushing and sieving to obtain nanoparticles of 20-80 meshes.

* * * * *